United States Patent
Prior

(10) Patent No.: US 6,626,978 B1
(45) Date of Patent: *Sep. 30, 2003

(54) METHOD FOR DRESSING MATERIALS

(75) Inventor: Adalbert Prior, Goetzis (AT)

(73) Assignee: Prior Engineering AG, Zürich (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,651

(22) PCT Filed: Nov. 30, 1995

(86) PCT No.: PCT/CH95/00282

§ 371 (c)(1),
(2), (4) Date: Jul. 29, 1996

(87) PCT Pub. No.: WO96/17097

PCT Pub. Date: Jun. 6, 1996

(51) Int. Cl.[7] .............................................. C22B 11/06
(52) U.S. Cl. ...................... 75/631; 75/10.28; 75/632; 75/633; 75/421
(58) Field of Search ................... 75/10.28, 631, 75/632, 633, 421; 423/22, 39; 266/144

(56) References Cited

U.S. PATENT DOCUMENTS

| | | |
|---|---|---|
| T867,020 I4 | 10/1969 | Strickland |
| 3,867,137 A | 2/1975 | Inouye |
| 3,998,926 A | 12/1976 | Oliver et al. |
| 4,086,084 A * | 4/1978 | Oliver et al. ................. 75/421 |

FOREIGN PATENT DOCUMENTS

| | | | |
|---|---|---|---|
| DE | 1 052 367 | 3/1959 | |
| FR | 1.547.653 | 11/1968 | |
| FR | 2 264 880 | 10/1975 | |
| GB | 798712 | 7/1958 | |
| JP | 3-13532 | * 1/1991 | .................. 423/22 |

OTHER PUBLICATIONS

Patent Abstracts of Japan, vol. 013, No. 562 (C–665), Dec. 13, 1989 & JP,A,01 234532 (Tanaka Kikinzoku Kogyo KK) Sep. 19, 1989.

Panias, Dimitris, et al. (1990) "Gold extraction from pyrite cinders by high temperature chlorination", in: Erzmetal, vol. 43, No. 1, pp. 41–44.

* cited by examiner

*Primary Examiner*—Melvyn Andrews
(74) *Attorney, Agent, or Firm*—Townsend, Townsend & Crew LLP

(57) ABSTRACT

A material benefication process and device for dressing a material comprising noble metals including platinum group metals. The device includes a reactor vessel with an inlet and an outlet for the processing medium. The material to be processed and a holder for the material are located inside the reactor vessel. The holder has a device for distributing the used processing medium flow. The process includes subjecting the material to an oxidizing treatment at a temperature within a first distinct temperature range, subjecting the material to a reducing treatment at a temperature within a second distinct temperature range, and chlorinating the material at a temperature within a third distinct temperature range different from at least the first distinct temperature range.

10 Claims, 1 Drawing Sheet

METHOD FOR DRESSING MATERIALS

BACKGROUND OF THE INVENTION

The present invention relates to a method for dressing a material comprising noble metals and platinum group metals, respectively, as well as impurities, and means for performing said method.

In practice, materials come to hand which have a total content of gold, platinum, palladium, rhodium, and iridium of 20% or more. Such materials mostly contain impurities being accompanying metals of said elements and/or other elements, which form volatile compounds and compounds of chlorine, respectively, with oxygen, hydrogen and chlorine. Materials of this kind may be residues from other processes, mixtures or alloys.

SUMMARY OF THE INVENTION

It is an object of the present invention to provide a method for dressing said materials in such a way that a concentrated residue of gold, platinum, palladium, rhodium and/or iridium is left, this dressing being done as economically and environmentally safe as possible.

In the method of the above kind, for dressing a material comprising noble metals including platinum group metals, as well as undesired materials comprises subjecting the materials to an oxidizing treatment at a temperature within a first temperature range. The material is then subsequently subjected to a reducing treatment at a temperature within a second temperature range. Finally, the material is chlorinated at a temperature within a third temperature range.

Another object of the present invention is providing means for performing said method.

According to the present invention, a device for performing a method for dressing a material comprising noble metals, including platinum group metals, as well as impurities, comprises a reactor vessel that includes an inlet for a treatment medium for the material. The inlet is located in the lower region of the reactor vessel. The vessel also includes an outlet for the treatment medium that is located in an upper region of the reactor vessel. The reactor vessel also includes a device for distributing a stream of the treatment medium that is arranged inside the reactor vessel.

DETAILED DESCRIPTION OF THE PREFERRED EXEMPLARY EMBODIMENTS

Figure 1:
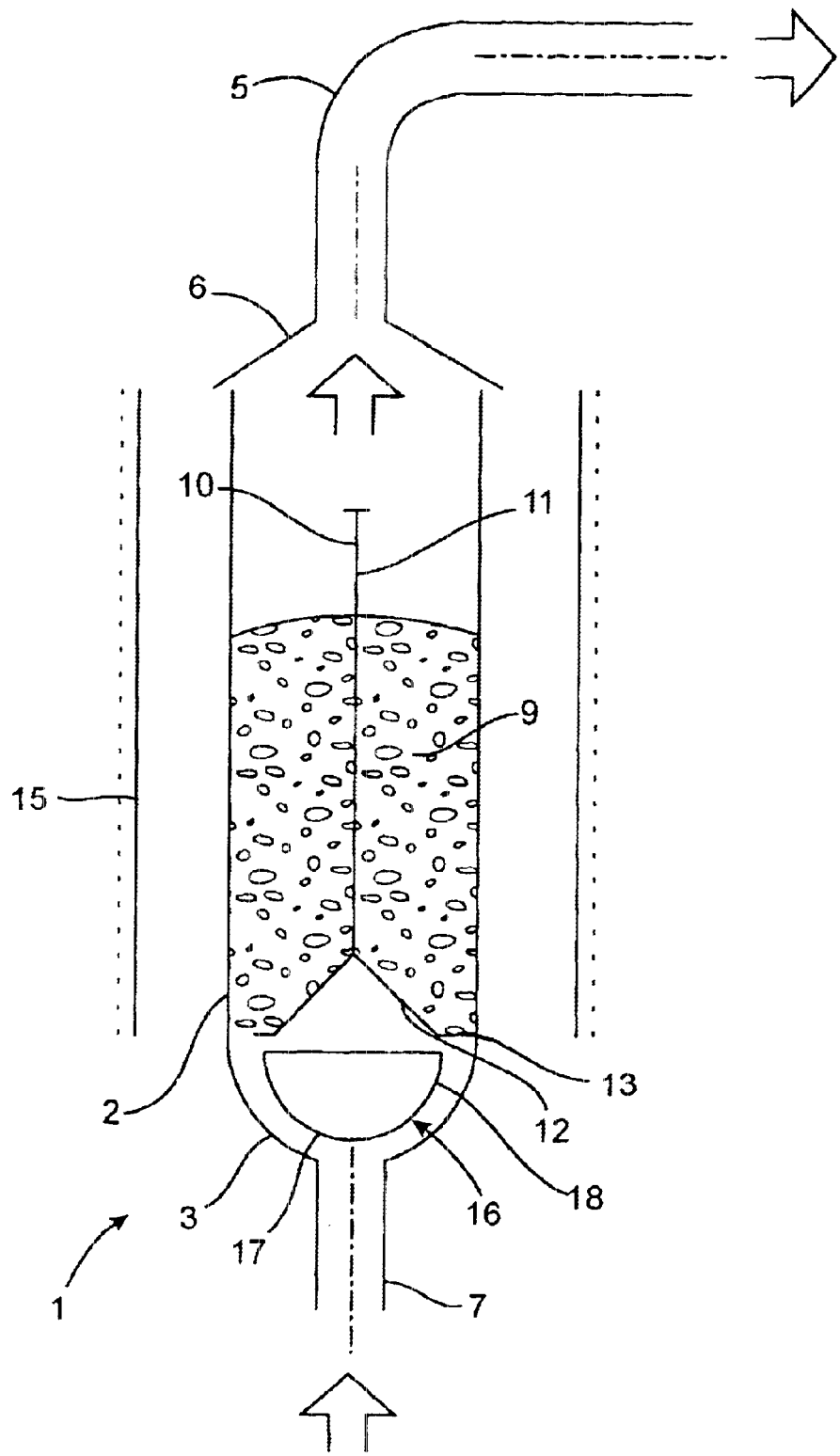
FIG. 1 is a schematical vertical section of a device for carrying out the method according to the invention.

The device shown in the drawing has a reaction vessel 1 provided with a substantially cylindrical jacket 2. Vessel 1 also is provided with a bottom 3, which is integral with vessel jacket 1 and is hemispherical in the illustrated embodiment. The upper end of vessel jacket 2 is associated with a venting device 5 through which gaseous and volatile components may escape from the interior of reactor 1.

The venting device 5 comprises a collector 6 having the shape of the jacket of a cone. The base of this collector 6 having the larger diameter faces the upper open end of vessel jacket 2, this section of collector 6 laterally overlapping this upper jacket opening. A discharge line, in which a fan (not shown) is positioned, is connected to the other base of cone jacket 6 having the smaller diameter. The end of this discharge line 5 is connected to a scrubber, advantageously a Venturi scrubber (not shown) in a manner known per se.

An inlet line 7 serving for feeding a gaseous treatment medium into the interior of reactor 1 is connected to the bottom 3 of vessel 1 at one end. In the embodiment shown, inlet line 7 is joined to the middle and lowest section of reactor base 3.

Inside vessel 1 and in the region of jacket 2 of this vessel a support 10 for the batch 9 of material to be treated is arranged. This support 10 has a stay bar 11 located approximately in the axial region of vessel jacket 2 and running in axial direction of this jacket 2.

A device 12 for distributing the stream of medium and gas, respectively, is attached to the lower end of this stay bar 11.

The distributing device 12 takes the form of a jacket of a cone, the tip of which is connected to the lower end of stay bar 11. The outer side of the edge of cone jacket 12 is provided with a collar 13, the outer edge of which contacts the inside of reactor jacket 2. This collar 13 takes the form of a flat ring practically lying in a horizontal plane. The batch 9 rests on cone jacket 12 and on collar 13.

Cone jacket 12 is made of mesh material so that the gaseous medium can reach batch 9 through this wall 12. The mesh aperture of said mesh may be adapted to the grain size of the material 9 to be treated in such a way that the material grains may not fall through mesh 12. The conical shape of cone jacket 12 increases the contact surface between jacket 12 and batch 9. The larger this surface, the larger the amount of gaseous medium that may reach the interior of batch 9.

The heat necessary for carrying out the individual process steps is introduced into reacting vessel 1 and into batch 9, respectively, through wall 2 of vessel 1 and/or by preheating the gases introduced into vessel 1. Preheating of the gaseous treatment medium is advantageously carried out before the gases reach inlet pipe 7, and this preheating may be done in a way known per se. Jacket 2 of vessel 1 is surrounded by a heating device 15 that may be heated by electrical current, gas, oil or the like. The heat generated by device 15 passes through reactor wall 2.

A heat exchanger 16 is located inside reactor vessel 1, namely in the region of inlet 7 in the bottom 3 of vessel 1. This heat exchanger 16 heats the gaseous treatment medium reaching reactor 1 through inlet pipe 7 to the appropriate working temperature. Basic body 17 of this heat exchanger 16 has a hemispherical shape, and the hemispherical bottom wall 18 of this basic body 17 faces towards the bottom 3 of vessel 1. The center of the sphere corresponding to basic body 17 and the center of the sphere corresponding to vessel bottom 3 coincide. Thus a ring-shaped gap is present between the wall of the hemispherical bottom 18 of the heat exchanger and the wall of the semispherical bottom 3 of the vessel in the equatorial region thereof, which gap is adjacent to the jacket 2 of reactor 1 an through which the treatment medium reaches distributor 12. The cone shaped device 12 distributes the medium from the wall 2 of the reactor over the whole surface or this device 12, so that the gaseous treatment medium reaches the material batch 9 via the entire surface of distributing device 12.

The material treated or dressed by the method according to the invention may be a solid mixture or a liquid or at least flowable alloy. It may, for instance, be a so-called concentrate from Ni or Cu or Zn refineries. Such concentrates are supplied to noble metal refineries for the recovery of noble or platinum metals. This material contains desired noble metals and platinum group metals, respectively, as well as undesired materials. These desired metals may be contaminated with undesired amounts of S, Se, Ag, Te, Cu, Ni, As, Sb and Pb. If the material is a solid, it must be present in comminuted form for treatment by the process according to the invention. Thus it may possibly first be necessary to comminute the material. The batch material 9 is to have a surface area of at least 5 m²/kg.

The batch material 9 formed as pieces is introduced into the reactor 1 from above so that it rests on the support 10. The reactor 1 is configured in such a way that the gaseous treatment medium enters the solids phase 9 via gas distributing device 12. The reactor 1 is brought to the operating temperature necessary for the respective process step, which may be achieved by heating device 15 and/or the heat exchanger 16 and/or by preheating the gaseous medium. The treatment medium penetrates through the batch material 9, while at the same time reacting with batch material 9. The treatment medium and volatile reaction products escape from the upper portion of batch material 9 and are vented from reactor vessel 1 by the venting device 5 and carried to the scrubber.

During a first treatment step in reactor 1, the material is first subjected to an oxidizing treatment at a temperature within a first temperature range. This oxidation is by means of oxygen or a gas mixture containing oxygen. This gas mixture may for instance contain 20% oxygen and 80% inert gas or air. The temperature range in which oxidation is carried out is between 200° C. and 800° C. Preferably this range is between 400° C. and 500° C.

In this process step those accompanying elements forming volatile compounds with oxygen are removed from the material. These accompanying elements may primarily be sulfur and selenium. After oxidation, the reactor 1 and its contents may be scavenged with an inert gas, as for instance nitrogen.

The batch material 9 is subsequently subjected to a reducing treatment at a temperature within a second temperature range. This reduction is done by means of a reducing gas or gas mixture, which may be hydrogen and a hydrogen/inert gas mixture, respectively. The hydrogen/inert gas mixture may be a hydrogen/nitrogen mixture containing at least 1% hydrogen. Metals that have formed oxides in the preceeding process step are returned to their metallic form during the reduction. Said second temperature range is between 200° C. and 1000° C., and preferably between 600° C. and 800° C. In this process step, volatile oxygen compounds are removed from batch 9. Subsequently it is possible, if required for reasons of safety, to scavenge with an inert gas, as for instance nitrogen, whereby $H_2$ residues, among others, are removed.

Subsequently the material of the batch 9 is chlorinated by introducing chlorine into the reactor 1. Chlorinating is done at a temperature within a third temperature range, and said third temperature range is between 800° C. and 1300° C., and advantageously between 900° C. and 1150° C.

In contrast to the platinum group metals and gold, a number of elements form stable chlorine compounds, for instance metal chlorides, as e.g. copper nickel chloride, nickel chloride, silver chloride etc. These chlorine compounds are volatile and are removed from the solid mixture together with reaction gas, and washed and further treated in known fashion in the scrubber, which may be a Venturi scrubber. In case non-volatile chlorine compounds are formed, they may be separated from the solids by means of washing with water, with aqueous or other solutions after the solids mixture has cooled.

After completion of this treatment process, gold as well as platinum, palladium, iridium, and rhodium remain as residue, and they are free of the accompanying metals and accompanying elements. $SiO_2$ may be left over as well.

This process is applicable not just to solids and solids mixtures, respectively, but also to alloys in liquid state. In this case, however, provision has to be made for the supply of reaction gas into the reactor 1 at an amount large enough for the flowable alloy not to flow through gas distributor 12.

What is claimed is:

1. A method for dressing a starting material comprising gold, platinum, palladium, iridium, or rhodium, the method comprising:

subjecting the starting material to an oxidizing treatment at a first temperature within a first distinct temperature range as a first stage to create a first intermediate material;

subjecting the first intermediate material to a reducing treatment at a second temperature within a second distinct temperature range as a separate, distinct and subsequent second stage to create a second intermediate material; and chlorinating the second intermediate material at a third temperature within a third distinct temperature range different from at least the first distinct temperature range as a separate, distinct and subsequent third stage, wherein a third material is produced from the second intermediate material after chlorinating, the third material comprising a concentrated residue of the starting material, wherein the concentrated residue comprises gold, platinum, palladium, iridium, or rhodium.

2. A method in accordance with claim 1 wherein the oxidizing treatment comprises exposing the starting material to at least one of either oxygen or an oxygen-containing gas mixture, wherein the reducing treatment comprises exposing the first intermediate material to at least one of either a reducing gas or a reducing gas mixture, and wherein the chlorinating of the second intermediate material comprises exposing the second intermediate material to chlorine.

3. A method in accordance with claim 2 wherein the reducing gas or reducing gas mixture comprises at least one of hydrogen or a hydrogen/inert gas mixture.

4. A method in accordance with claim 1 wherein the first temperature range is between 200° C. and 800° C., wherein the second temperature range is between 200° C. and 1,000° C., and wherein the third temperature range is between 800° C. and 1,300° C.

5. A method in accordance with claim 4 wherein the first temperature range is between 400° C. and 500° C., wherein the second temperature range is between 600° C. and 800° C., and wherein the third temperature range is between 900° C. and 1,150° C.

6. A method in accordance with claim 1 further comprising scavenging the first intermediate material with an inert gas after the oxidizing treatment and before the reducing treatment.

7. A method in accordance with claim 6 wherein the inert gas comprises nitrogen.

8. A method in accordance with claim 2 wherein non-volatile chlorine compounds are formed in the third material after the step of chlorinating the second intermediate material, and wherein the method further comprises washing-out the non-volatile chlorine compounds in the third material, after cooling the third material.

9. A method in accordance with claim 1 further comprising comminuting the starting material before the oxidizing treatment.

10. A method in accordance with claim 1 wherein the starting material comprises gold, platinum, palladium, iridium, and rhodium, and wherein the third material comprises a concentrated residue of gold, platinum, palladium, iridium, and rhodium.

* * * * *